United States Patent
Yeh et al.

(10) Patent No.: US 11,698,440 B2
(45) Date of Patent: Jul. 11, 2023

(54) TRACKING AGGREGATION AND ALIGNMENT

(71) Applicant: Universal City Studios LLC, Universal City, CA (US)

(72) Inventors: Wei Cheng Yeh, Orlando, FL (US); Travis Jon Cossairt, Celebration, FL (US); Rachel Rodgers, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 320 days.

(21) Appl. No.: 16/831,498

(22) Filed: Mar. 26, 2020

(65) Prior Publication Data

US 2020/0319305 A1 Oct. 8, 2020

Related U.S. Application Data

(60) Provisional application No. 62/828,198, filed on Apr. 2, 2019.

(51) Int. Cl.
*G01S 7/48* (2006.01)
*G01S 17/86* (2020.01)
*G01S 17/66* (2006.01)

(52) U.S. Cl.
CPC ............ *G01S 7/4808* (2013.01); *G01S 17/66* (2013.01); *G01S 17/86* (2020.01)

(58) Field of Classification Search
CPC ........ G01S 7/4808; G01S 17/66; G01S 17/86; G01S 7/4802; G01S 13/04; G01S 17/42; G01S 17/87; G01S 13/865; G01S 13/06; G06V 20/52; G06K 17/0025
See application file for complete search history.

(56) References Cited

U.S. PATENT DOCUMENTS

| | | | |
|---|---|---|---|
| 10,309,784 B2 * | 6/2019 | Bageshwar | G01S 13/726 |
| 10,929,661 B1 * | 2/2021 | Manyam | G06V 20/52 |
| 2010/0026809 A1 | 2/2010 | Curry | |
| 2012/0143808 A1 * | 6/2012 | Karins | G06N 7/005 706/46 |
| 2014/0334684 A1 * | 11/2014 | Strimling | G08G 1/123 382/104 |
| 2015/0253124 A1 * | 9/2015 | Steffey | G01S 7/4808 356/614 |
| 2016/0092739 A1 * | 3/2016 | Oami | G06V 20/52 348/159 |
| 2016/0231426 A1 | 8/2016 | Smith et al. | |
| 2018/0107880 A1 | 4/2018 | Danielsson et al. | |

(Continued)

FOREIGN PATENT DOCUMENTS

WO 2017147606 8/2017

OTHER PUBLICATIONS

PCT/US2020/025806 Invitation to Pay Additional Fees dated Jul. 30, 2020.

(Continued)

*Primary Examiner* — Mohammad K Islam
(74) *Attorney, Agent, or Firm* — Fletcher Yoder, P.C.

(57) ABSTRACT

Systems and methods are disclosed that provide contextual tracking information to tracking sensor systems to provide accurate and efficient object tracking. Contextual data of a first tracking sensor system is used to identify a tracked object of a second tracking sensor system.

25 Claims, 8 Drawing Sheets

(56) References Cited

U.S. PATENT DOCUMENTS

| | | | |
|---|---|---|---|
| 2018/0231653 A1* | 8/2018 | Pradeep | G06T 7/60 |
| 2019/0043207 A1* | 2/2019 | Carranza | G06V 40/172 |
| 2019/0043281 A1* | 2/2019 | Aman | G07C 9/257 |
| 2020/0033857 A1* | 1/2020 | Yu | H04W 4/38 |

OTHER PUBLICATIONS

Germa et al., "Vision and RFID data fusion for tracking people in crowds by a mobile robot," Computer Vision and Image Understanding, Jun. 2010, pp. 641-651, vol. 114, issue 6.

Li et ai., "Online People Tracking and Identification with RFID and Kinect," pp. 1-8.

Goller et al., "Fusing RFID and Computer Vision for Probabilistic Tag Localization," 2014 IEEE international Conference on RFID (IEEE RFID), pp. 89-96.

\* cited by examiner

TRACKING AGGREGATION AND ALIGNMENT

CROSS-REFERENCE TO RELATED APPLICATION

This application claims priority to and the benefit of U.S. Provisional Application No. 62/828,198, entitled "Tracking Aggregation and Alignment," filed Apr. 2, 2019, which is hereby incorporated by reference in its entirety for all purposes.

BACKGROUND

The present disclosure relates generally to tracking systems. More specifically, certain embodiments of the present disclosure relate to aggregation and handoff of tracking system data between tracking systems to facilitate more efficient and effective tracking of objects within an environment.

In the Digital Age, with the increase of digital sensors, object tracking has become increasingly desirable. Unfortunately, in large/open environments, user tracking is a very challenging prospect, especially when accurate location and activity tracking is desired. As used herein, open environments refer to areas that allow tracked objects to move in a multitude of directions with relatively little confinement. For example, such environments might include an amusement park, an airport, a shopping mall, or other relatively larger-scale environments that may have multiple tracking coverage zones. Accurate tracking of unique individuals is challenging, especially in open environments and in situations where crowd density presents issues of obstruction where one individual might block another.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

Embodiments described herein relate to a tracking system that efficiently aggregates and/or communicates tracking data between tracking systems, enabling context of one tracking sensor to enhance tracking of other tracking sensors. More specifically, the contextual information (e.g., location, time, tracked object identities) determined by one tracking sensor may be used to facilitate more efficient and/or more effective tracking of other sensors. For example, such contextual information may result in increased confidence of a tracked object's identity, may result in efficient filtering of possible identities that can be attributed to a tracked object, etc. This may result in increased processing efficiencies and may also enable more granular tracking of objects in an open environment.

By way of example, in a first embodiment tangible, non-transitory, machine-readable medium, includes machine-readable instructions that, when executed by one or more processors of the machine, cause the machine to: receive a tracked target context for a first tracked object from a first tracking sensor system; provide the tracked target context from the first tracking sensor system to a second tracking sensor system different than the first tracking sensor system; and cause identification of a newly observed tracked target by the second tracking sensor system based upon the tracked target context from the first tracking sensor system.

In a second embodiment, a computer-implemented method, includes: receiving a tracked target context for a first tracked object from a first tracking sensor system; providing the tracked target context from the first tracking sensor system to a second tracking sensor system different than the first tracking sensor system; and causing identification of a newly observed tracked target by the second tracking sensor system based upon the tracked target context from the first tracking sensor system.

In a third embodiment, a system includes: a first tracking sensor system, a second tracking sensor system, and a contextual tracking sensor system. The first tracking sensor system tracks a first tracked object in a first coverage area. The second tracking sensor system tracks a second tracked object in a second coverage area. The contextual tracking system receives a tracked target context for the first tracked object from the first tracking sensor system; provides the tracked target context from the first tracking sensor system to the second tracking sensor system different than the first tracking sensor system; and causes identification of the second tracked object based upon the tracked target context from the first tracking sensor system.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
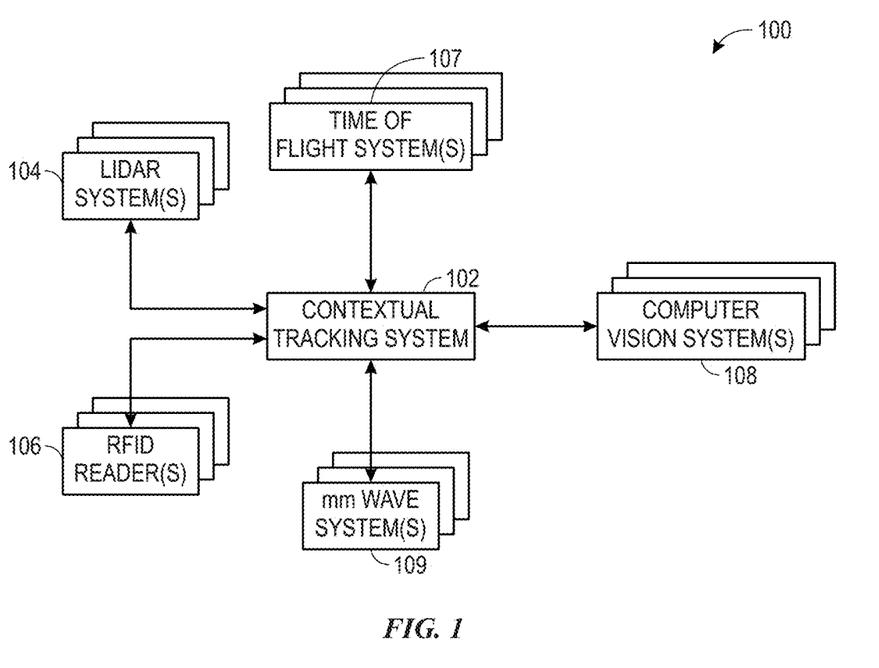
FIG. 1 is a schematic diagram, illustrating a multi-sensor tracking component with a contextual tracking system, in accordance with an embodiment of the present disclosure.

The present disclosure generally relates to a tracking system that accumulates and/or hands off contextual information for efficient and effective tracking processing. By using previously determined context of other tracking sensors, independent tracking sensors may more efficiently determine tracked object identities. With this in mind, FIG. 1 is a schematic diagram, illustrating a multi-sensor tracking system 100 with a contextual tracking system 102, in accordance with an embodiment of the present disclosure. As illustrated, the multi-sensor tracking system 100 includes a plurality of tracking sensors, such as one or more light detection and ranging (LIDAR) systems 104, one or more radio-frequency identification (RFID) reader systems 106, one or more Time of Flight (ToF) systems 107, one or more computer vision systems 108, and/or one or more millimeter wave (mmWave) systems 109.

The LIDAR systems 104 may track individuals, objects, and/or groups of individuals or objects by illuminating targets with pulsed light and measuring reflected pulses. The differences in wavelength and time between the pulsed light and reflected pulses may be used to generate spatial indications of a location of target individuals, groups, and/or objects. The LIDAR systems 104 are capable of covering large areas of space, while detecting objects with relative ease and efficiency. However, the LIDAR systems 104 may not be effective at actually making an identification of the tracked objects, but instead may best be used to identify the existence and location of objects independent of an identification of the objects.

The RFID reader systems 106 may read digital data encoded in RFID tags (e.g., worn by individuals or placed on particular objects to track the individuals or objects). As RFID tags enter a proximity of an RFID reader, the RFID reader may provide an energizing signal to the RFID tag, causing the RFID tag to emit radiation that is interpretable by the RFID reader to identify a particular RFID tag. Because each RFID tag has its own unique identifying information, the RFID reader systems 106 may effectively and efficiently identify tracked targets. However, RFID reader systems 106 require RFID tags to be placed is a relatively close proximity to the RFID readers, resulting in less coverage and/or significant hardware costs to implement a multitude of RFID readers.

Similar to the LIDAR systems 104, the ToF systems 107 (e.g., three dimensional Time-of-Flight sensor systems) may track individuals, groups, and/or objects by illuminating targets with pulsed light and measuring characteristics of reflected pulses. Specifically, the ToF systems 107 may emit pulses of infrared light and measure a time corresponding to a return of the pulses. The ToF systems 107 may also map textures (e.g., skin texture) to identify individuals, groups, and/or objects. Thus, the ToF systems 107 may obtain a three dimensional position and texture attributes of tracked identities. Another benefit is that, because the ToF systems 107 may not be dependent on visible lighting conditions, the ToF systems 107 may not incur lighting condition restrictions, which may be characteristic of some camera-based visual acquisition systems. However, redundant systems may still be useful, as the ToF systems 107 may be less effective and accurate in certain environmental conditions such as on a rainy day.

The computer vision systems 108 may receive camera data (e.g., still images and/or video) for contextual analysis. For example, the camera data may be analyzed to perform object recognition and/or tracking. Using facial recognition, the computer vision systems 108 may identify tracked targets. Unfortunately, however, computer vision systems 108 can be quite costly, while oftentimes covering a limited tracking area. Further, computer vision systems 108 can take quite some time to analyze computer images.

The millimeter wave (mmWave) systems 109 (e.g., millimeter wave radar sensor systems) may provide a large bandwidth to authenticate the presence of tracked identities. Specifically, the mmWave systems 109 may allow for high rates of data to be transferred at a low latency. For example, the mmWave systems 109 may include devices that emit and/or receive millimeter waves to communicate with one or more computing devices (e.g., a wearable device) associated with an individual in order to quickly identify an individual (or authenticate an identity proposed by the individual). Further, the mmWave systems 109 may be able to maintain tracking of tracked identities even through surfaces (e.g., radio wave-transparent physical barriers, such as windows and walls). However, the mmWave systems 109 may utilize components that are relatively close to tracked identities, resulting in less coverage.

As may be appreciated, each of the tracking systems has its tradeoffs. Accordingly, it may be desirable to use a combination of tracking systems, such that each of the benefits of the various tracking systems may be used in conjunction with one another. To do this, the contextual tracking system 102 is tasked with maintaining and/or trading tracking data from each of the various tracking systems. For example, the contextual tracking system 102 may receive positional information from LIDAR systems 104, object identifiers obtained from an RFID tag that is in proximity to one or more of the RFID reader systems 106, and/or an object identity and/or position from the computer vision systems 108.

Figure 2:
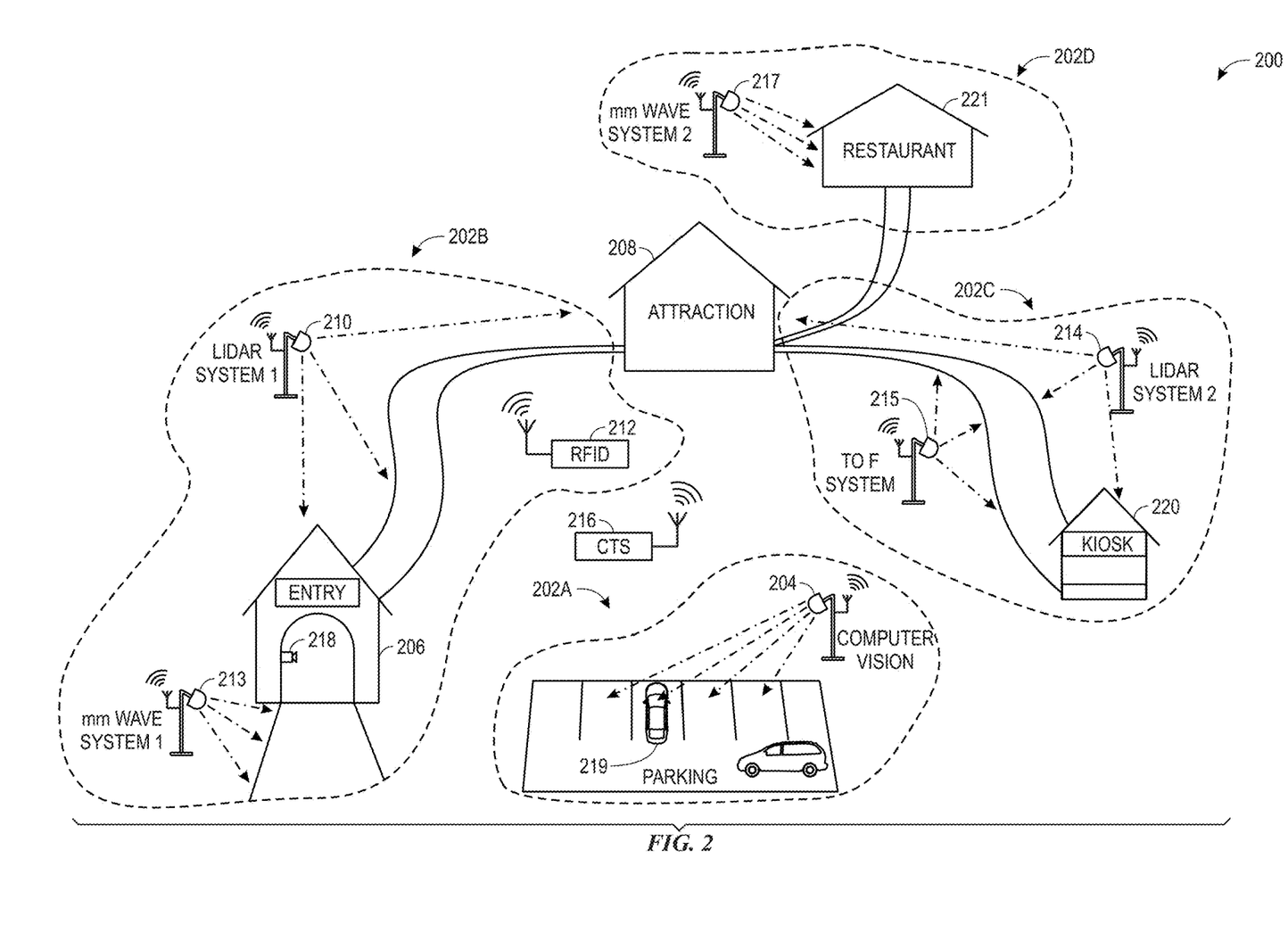
FIG. 2 is a schematic diagram, illustrating an open environment that uses the system of FIG. 1, in accordance with an embodiment of the present disclosure.

Using this information, object tracking within an open environment may be more effectively and efficiently obtained. FIG. 2 is a schematic diagram, illustrating an open environment 200 that uses the system of FIG. 1, in accordance with an embodiment of the present disclosure. Though FIG. 2 illustrates a theme park environment, the current discussion is not intended to limit the application of the contextual tracking system to such embodiments. Indeed, the current techniques could be used in a variety of environmental applications.

As illustrated, the open environment 200 may have many separate coverage zones 202A, 202B, 202C, and 202D that are each tracked by one or more sensor systems. For example, coverage zone 202A is a parking lot that is tracked by a computer vision system 204. The coverage zone 202B is an area between an entry gate 206 and an attraction 208. The coverage zone 202B has a LIDAR system 210, an RFID reader system 212, and a mmWave system 213. The coverage zone 202C is tracked by a second LIDAR system 214 and a ToF system 215. The coverage zone 202D is tracked using a second mmWave system 217.

A contextual tracking system 216 is communicatively coupled to the various tracking systems in the open environment 200. Similar to the contextual tracking system 102 of FIG. 1, the contextual tracking system 216 may maintain and/or trade tracking data between tracking systems. For example, computer vision system 204 may detect a particular car 219 in the coverage zone 202A. The computer vision system 204 may analyze visual images of the car 219 to make an identification of the car 219. For example, the computer vision system 204 may identify alphanumeric characters of the license plate of the car 219 to make the identification of the car 219.

Identified objects may be used to identify other objects in the contextual tracking system 216. For example, the identification of the car 219 may be provided to the contextual tracking system 216. The car 219 may be identified as corresponding to one or more persons (e.g., a group of persons) whom the computer vision system 204 has detected an exit from the car 219 at a specific time, for example. Based upon this information, the contextual tracking system 216 may determine that the one or more persons are likely in the coverage zone 202A. Moreover, the identities of the persons or of the group based on the computer vision system 204 may be used in determining the identities of the persons or group in another coverage zone. In particular, the contextual tracking system 216 may note characteristics unique to the one or more persons identified in coverage zone 202A and may use the noted characteristics in determining identities of tracked objects in other coverage zone such as coverage zone 202B and the coverage zone 202D.

By providing such context to other tracking sensors of the contextual tracking system 216 and/or coverage zones, tracking analysis may be more aware of likely candidate objects that will be approaching. For example, if the computer vision system 204 provides an indication that Car A is in the parking lot (or that Person A or Group A that is associated with Car A is likely in the parking lot [e.g., based upon the presence of Car A in the parking lot]) to tracking sensors in neighboring coverage zones, the tracking sensors in these neighboring coverage zones may be "pre-heated" with data that identifies likely object identifiers. Accordingly, in some embodiments, larger coverage systems with fewer object identification capabilities, such as the LIDAR system 210, may be used to track the users' locations, depending at least partially on the identification provided by the computer vision system 204. Furthermore, as briefly noted above, identified objects may be used to identify other objects such as groups of people. Indeed, it may be beneficial for the contextual tracking system 216 to track groups. For example, the car 219 may be identified as corresponding to a group of persons (e.g., Group A). In this case, the contextual tracking system 216 may determine that all persons who exit the car 219 have an association with each other and thus, may comprise Group A. As will be discussed later, other methods of identifying and determining groups are possible.

If only one user is associated with the Car A, there may be a high likelihood that a single identified object exiting the car is the associated user. However, in some instances, a threshold level of likelihood may not be met by a context provided from a preceding tracking system. In such a case, additional tracking may selectively be enabled to identify the particular object/user. For example, another computer vision system 218 at the entry gate 206 to identify the object/user. As the entry gate 206 is a funnel-in location with desirable direct-view access of the object/user, this location may be a prime location for the computer vision system 218. In such embodiments, where an individual object/user is detected by the computer vision system 218, the object identification analysis performed by the computer vision system 218 may be greatly impacted by the contextual data provided by the computer vision system 204 via the contextual tracking system 216. For example, the possible candidates for the identification may be filtered down based upon the data provided by the computer vision system 204, resulting in more efficient and faster processing of object/user identification. Further, the mmWave system 213 in coverage zone 202B may also be used to identify or authenticate the presence of an individual object/user. Indeed, the mmWave system 213 may work alongside the computer vision system 218 in identifying objects. For example, mmWave system 213, using the contextual data provided by the computer vision system 204 via the contextual tracking system 216, may serve as a second mechanism to filter possible candidates to increase the accuracy and processing speed of an object's identification.

The contextual tracking system 216 may, in some embodiments, use positioning information to infer/predict an identification of an object/user. For example, if the RFID reader system 212 indicates that Person A is entering the attraction 208 at 12:00 Noon and the attraction 208 has an exit point that is typically reached in 10 minutes, the second LIDAR system 214 may infer/predict that an object that reaches the exit point at 12:10 is likely Person A. Therefore, tracking systems that provide detailed identification of an object/user may not be necessary at the exit of the attraction 208, resulting in a more-efficient use of resources. Moreover, tracking systems need not necessarily be in a line-of-sight of an object/user. Indeed, as illustrated in the coverage zone 202D, the second mmWave system 217, although not being in the line-of-sight of objects located in a restaurant 221, is positioned to track objects in the restaurant 221. The second mmWave system 217 may be capable of this type of communication because certain materials (e.g., fabrics, fiberglass reinforced plastic, etc.) associated with the restaurant 221 and/or the tracked object may be transparent (e.g., radio frequency transparent) to the radiation emerging from the second mmWave system 217.

As will be discussed in more detail below, the tracking information (e.g., identification and location of an object/user) may be used for many different purposes. For example, in one embodiment, a kiosk 220 may provide specific information useful to an identified object/user upon tracking the particular object/user to the kiosk 220. Further, in some embodiments, this tracking may help theme park personnel understand object/user interests based upon locations (e.g., attractions, restaurants, etc.) that the object/user is tracked to.

Figure 3:
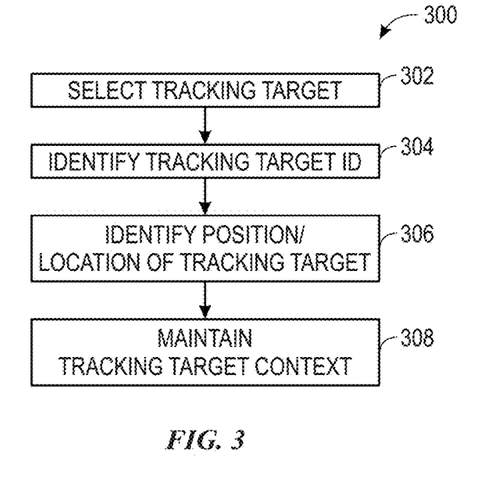
FIG. 3 is a flowchart, illustrating a process for identifying a tracking context, in accordance with an embodiment.

Having discussed the basic utility of the contextual tracking system, FIG. 3 is a flowchart, illustrating a process 300 for identifying and maintaining a tracking context, in accordance with an embodiment. The process 300 begins by selecting a tracking target (block 302). The tracking target may be selected based upon one or more criteria of objects observed in the environment and may differ from coverage zone to coverage zone. For example, with regard to the open environment 200, the coverage zone 202A may be particularly interested in tracking vehicles in a parking lot. Accordingly, tracking targets may be selected based upon a range of object motion speed, object size, object shape, etc. that is attributable to vehicles. In contrast, it may be assumed that in coverage area 202B there are no vehicles, but instead persons associated with vehicles. Thus, the criteria for selecting tracking objects in coverage zone 202B may be a range of object motion speed, object size, object shape, etc. that is attributable to a person or group of persons.

The process 300 continues by identifying a tracking target identity (block 304). For example, as mentioned above, the identity may be determined based upon computer vision analysis of the object (e.g., at the entry gate 206), based upon other identified objects, where a relationship between the other identified object and the tracked target is recorded (e.g., in tangible storage of the contextual tracking system 216, etc.).

Once the identity is determined, the position and/or location of the tracking target is identified (block 306). This information, in conjunction with the identity, may be useful to other tracking sensor systems, enabling the tracking sensor systems to filter in or filter out particular identities (e.g., a subset of identities) as possible identities for objects that they track. For example, as mentioned above with regard to FIG. 2, an identity and location that indicates Person A is going into an attraction, along with a duration estimation of the attraction length from start to finish, may enable a tracking system covering that exit of the attraction to filter in Person A as a likely identity of an object detected at the exit point of the attraction at or near the end of the duration estimation. Further, if Person A is in the attraction, Person A is clearly not in the parking lot as well. Accordingly, tracking system sensors in the parking lot can filter out Person A as candidate identity, enabling faster response times of the identification analysis.

As may be appreciated, the tracking target context is maintained and/or traded by the contextual tracking system (block 308). As mentioned herein, a tracking target context may include observed activities of a particular tracking sensor system, such as a tracking time, tracking location, tracking identity, tracking identities associated with a tracked object, etc. In some embodiments, the contextual tracking system may, in some embodiments, maintain the context data and also filter in or filter out candidates based upon the context data, providing the filtering results to the tracking systems for efficient identification analysis. In other embodiments, the contextual tracking system may provide the context to the tracking systems, enabling the tracking systems to perform the filtering and the identification based upon the filtering.

Figure 4:
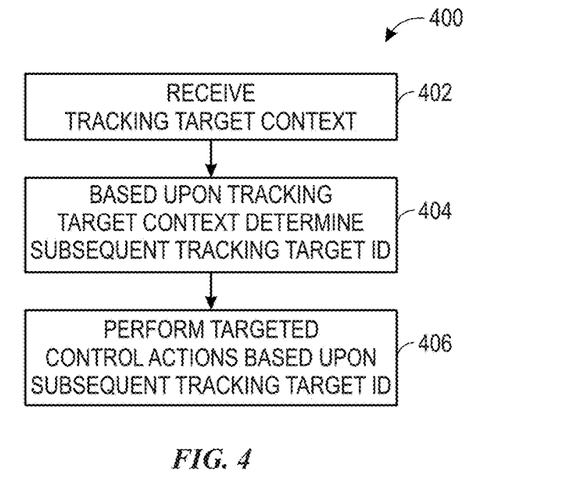
FIG. 4 is a flowchart, illustrating a process for using acquired context to identify context at a subsequent tracking sensor, in accordance with an embodiment.

FIG. 4 is a flowchart, illustrating a process 400 for using acquired context to identify context at a subsequent tracking sensor, in accordance with an embodiment. Process 400 begins by receiving the tracking target context (or the filtering information if the tracking target context is maintained at the contextual tracking system) (block 402). Once received, the tracking sensor may determine the identity of an object using the filtering in and/or filtering out techniques discussed above (block 404).

Targeted control actions are performed based upon the subsequent tracking identifier (block 406). For example, as mentioned above, a kiosk may be controlled to display particular information useful for an identified person. In other embodiments, access to particular restricted portions of the environment may be granted based upon determining that the identity is authorized for access to the restricted portion of the environment. Further, in some embodiments, metric tracking, such as visits to particular areas, recorded activities of users, etc. may be maintained for subsequent business analytics, research, and/or reporting.

Figure 5:
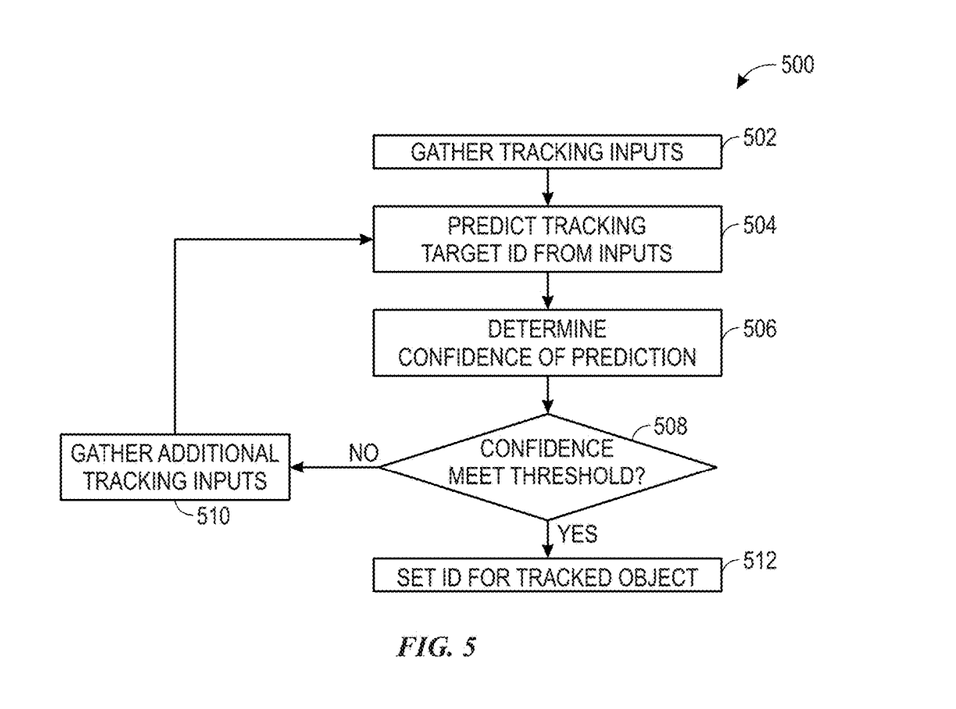
FIG. 5 is a flowchart, illustrating a process for using a confidence interval for determining sufficient context for target identification, in accordance with an embodiment.

As mentioned above, at times, a particular threshold level of confidence may be required to make an affirmative match of an identity to a tracked object. FIG. 5 is a flowchart, illustrating a process 500 for using a confidence interval for determining sufficient context for target identification, in accordance with an embodiment. The process 500 begins by gathering tracking sensor inputs (e.g., context) (block 502). As mentioned above, the contextual tracking system may receive tracking sensor inputs that provide an identity, location, and/or other information that provides possible context for observed objects of other tracking sensors.

Based upon these tracking inputs, one or more tracking identities for observed object may be predicted by other tracking sensors (block 504). For example, as mentioned above, contextual information indicating that a particular Person A has entered an attraction may be used to assume that Person A will eventually exit the attraction, perhaps at a predicted time based upon attributes of the person and/or attributes of the attraction. For example, if the person is observed by the tracking system as having a below average or above average moving speed, an average amount duration for an attraction may be adjusted down or up, accordingly. This adjusted duration may be used to determine when Person A is likely to exit the attraction, enabling the tracking system at the exit of the attraction to predict that a person leaving the attraction at the adjusted duration is Person A.

In some embodiments, a prediction confidence score may be calculated. The prediction confidence score may indicate a likelihood that a tracked object has a particular identity. For example, if, based upon known information, the target is very likely Person A, the prediction confidence score may be larger than when, based upon the known information, the target is only somewhat likely or is not likely Person A. The prediction confidence score may vary based upon a number of factors. In some embodiments, redundant information (e.g., similar identification using two or more sets of data) may increase the prediction confidence score. Further, observable characteristics of a tracked object may be used to influence the prediction confidence score. For example, a known size associated with an identity can be compared to a size of a tracked target. The prediction confidence score may increase based upon a closeness in the known size and the size of the target observed by the tracking sensors.

After the prediction confidence score is obtained, a determination is made as to whether the prediction confidence score meets a score threshold (decision block 508). The score threshold may indicate the minimum score that can result in an identity being associated with a tracked target.

Figure 6:
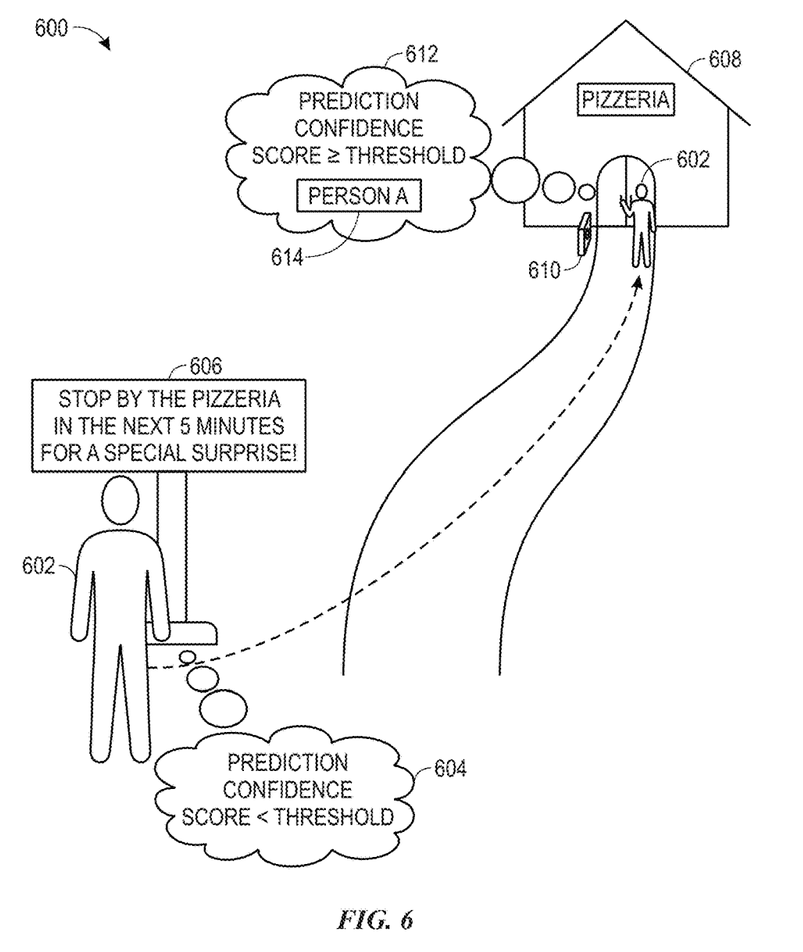
FIG. 6 is a schematic diagram, illustrating an example diversion to increase tracking inputs, in accordance with an embodiment.

If the prediction confidence score does not meet the threshold, additional tracking inputs may be obtained (block 510). To obtain additional tracking inputs, the tracking sensors in the open environment may continue to accumulate tracking information and/or obtain context data for the tracked target. In some embodiments, the tracked targets may be encouraged to move towards particular sensors to obtain new tracking inputs regarding the tracked target. For example, FIG. 6 is a schematic diagram, illustrating an example diversion scenario 600 to increase tracking inputs, in accordance with an embodiment. In the scenario 600, the prediction confidence score for a tracked target 602 is less than the threshold, as indicated by balloon 604. Accordingly, an electronic display 606 may be controlled to display a message that directs the target towards a location where additional tracking inputs may be obtained, here the pizzeria 608. Here, the target is encouraged to move towards the pizzeria 608 by providing an electronic notice via an electronic billboard that directs the target to the pizzeria 608. At the entrance to pizzeria 608, there is an additional tracking sensor (e.g., RFID reader 610). The tracking sensor obtains additional tracking inputs of the target 602 as the target 602 moves into the vicinity of the pizzeria 608.

Returning to FIG. 5, when the additional tracking inputs are gathered, an additional prediction of the target's identity is made (block 504), a new prediction confidence score using the newly gathered additional tracking inputs is determined (block 506), and an additional determination is made as to whether the prediction confidence threshold is met (decision block 508). This process may continue until the prediction confidence threshold is met.

Once the prediction confidence threshold is met, the identifier may be attributed to the tracked object (block 512). For example, returning to FIG. 6, that additional tracking information received via the RFID reader 610 results in the prediction confidence score increasing to a level greater than or equal to the threshold, as indicated by balloon 612. Thus, the tracked target 602 (e.g., tracked object) is attributed to the identifier 614 (e.g., Person A).

Figure 7:
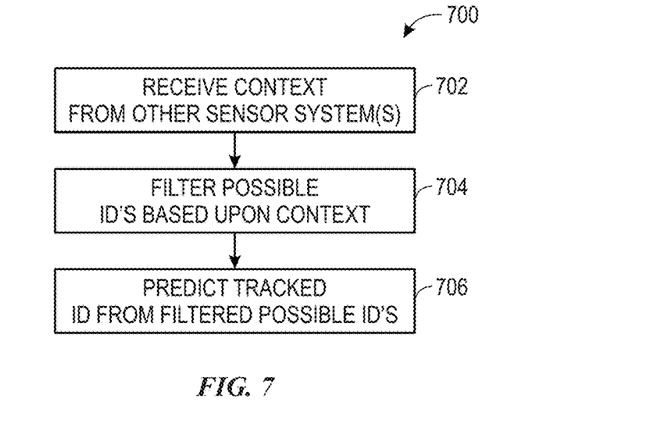
FIG. 7 is a flowchart, illustrating a process for filtering possible identification predictions based upon provided sensor context, in accordance with an embodiment.

As mentioned above, the context provided by one tracking sensor system may be useful for analysis by other tracking sensor systems. For example, candidate prediction identities may be "filtered-in" (e.g., whitelisted) or "filtered-out" (e.g., blacklisted) based upon a context provided from another tracking sensor system. FIG. 7 is a flowchart, illustrating a process 700 for filtering possible identification predictions based upon provided sensor context, in accordance with an embodiment.

The process 700 begins with receiving context data from other sensor systems (block 702). For example, the context data may include tracked object identities, locations of the tracked objects, and a time stamp indicative of when the tracked object was at certain locations.

The context data may be used to supplement tracking functions of the tracking sensor. For example, possible candidate identities for a newly observed tracked object may be filtered (e.g., filtered-in or filtered-out) based upon contextual information indicative of locations of identified tracked objects provided by the other tracking sensors (block 704). For example, if a parking lot tracking sensor indicates that a target object with the identity of Person A was tracked in the parking lot five minutes ago and it takes 20 minutes to travel from the parking lot to a coverage area associated with the tracking sensor that observed the new target object, the identity of Person A can filtered out as a possible candidate identity for the new target object, as it would not be feasible for Person A to get from the parking lot to the coverage area in five minutes. Additionally and/or alternatively, filtering in of candidate identities may occur by obtaining contextual data that indicates which identities could possibly have reached the coverage area at the time the new target object was observed. These identities may be whitelisted as the possible candidate identities for the observed new target object in the coverage area. This can save processing time and improve operations of computer systems employed in accordance with disclosed embodiments.

Once the candidate identities are filtered, the tracking system may predict an identity for the new tracked object from the filtered candidate identities (block 706). For example, the identity may be picked from a list of identities not filtered-out (e.g., not in a blacklist) and/or may be picked from a list of identities filtered-in (e.g., in a whitelist). As may be appreciated, this may enable more efficient object tracking, as contextual information may reduce a number of candidate identities to consider for identifying the tracking object. Further, in some instances, without such context, no identity tracking may be possible. For example, certain LIDAR systems may not be capable of performing an identification of a target object without such context. Thus, the current techniques provide efficient and increased tracking abilities over prior tracking systems.

Figure 8:
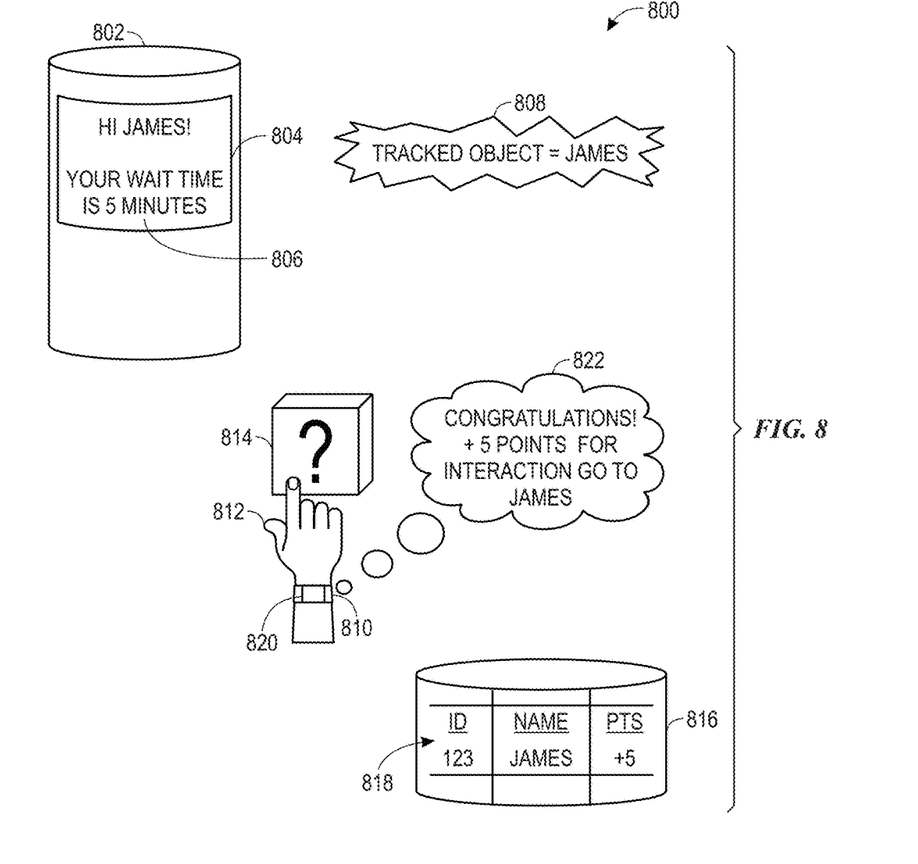
FIG. 8 is a schematic diagram, illustrating example control actions based upon tracked identities, in accordance with an embodiment.

Having discussed the enhanced contextual tracking techniques, FIG. 8 is a schematic diagram, illustrating example control actions 800 that may be achieved based upon identities tracked via the contextual tracking techniques provided herein, in accordance with an embodiment. In one embodiment, a kiosk 802 or other device may include a display 804. The display 804 may present a graphical user interface (GUI) 806 that provides information about the open environment. As illustrated, the GUI 806 may be personalized based upon a tracked identity. For example, as illustrated by the status balloon 808, the contextual tracking system may identify that a tracked object is "James" based upon context data tradeoffs between the various target sensors. In response to the tracked object nearing the display 804, a control action command may be presented to the display 804 (e.g., the underlying hardware controlling the display 804) instructing the GUI 806 to display information relevant to the identified person. Here, for example, James is provided with a personalized wait time associated with his identity. As may be appreciated, each identity may be associated with a unique identifier and other information (e.g., wait times, demographic information, and/or other personalized data), enabling personalized control actions to be performed. Further, as will be discussed with respects to FIG. 12, control actions may be achieved based upon identities that correspond to a group.

In another embodiment, a wearable device 810 may be disposed on the tracked object 812. Based upon interaction with an open environment feature 814, here a virtual game mystery box, personalized data associated with the identity of the tracked object may be updated. For example, here a game database 816 may be updated, via a control action command, to reflect an updated game status based upon interaction with the open environment feature 814. Thus, as illustrated in database record 818, the identity 123, which is associated with James is provided with an additional 5 points in the database. Further, a display 820 of the wearable device 810 may be controlled, via a control action command, to display an indication 822 confirming the status change based upon the interaction of the tracked object 812 with the open environment feature 814.

Figure 9:
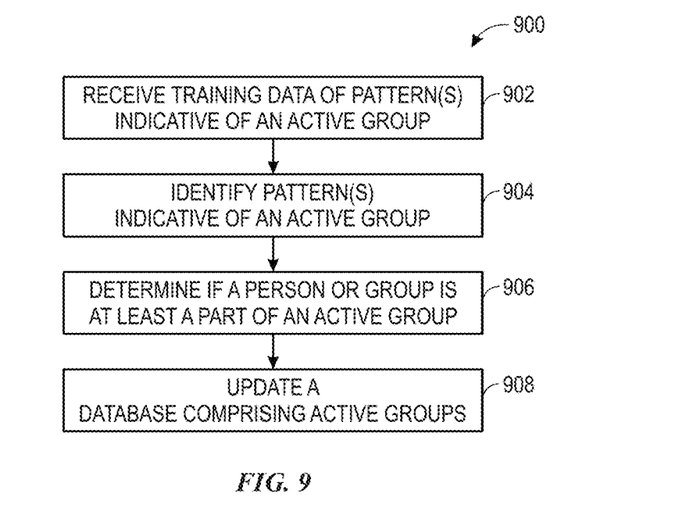
FIG. 9 is a flowchart for grouping individuals into groups using machine learning techniques, in accordance with an embodiment.

As mentioned above, the contextual tracking system may identify and track groups. While particular patterns of data indicative of identification and/or tracking of groups are discussed below, these are merely examples. As may be appreciated, using machine learning, additional data patterns indicative of groupings may be observed by the machine learning systems described herein. FIG. 9 is a flowchart of a method 900 for grouping individuals using machine learning techniques. One or more steps of the method 900 may be performed by one or more components of the contextual tracking system 102 of FIG. 1 or the contextual tracking system 216 of FIG. 2. Indeed, a grouping system (e.g., machine learning system) may be integrated into the contextual tracking system 102 of FIG. 1 or the contextual tracking system 216 of FIG. 2. In particular, the grouping system may receive training data of pattern(s) that are indicative of an active group (Block 902). For example, the patterns indicative of an active group may include a proximity level between one or more persons for a certain amount of time, an indication of an association of a vehicle with one or more persons, etc. In some embodiments, the pattern(s) may include an indication of association, such as a presumed child with one or more persons (e.g., adults) based on a height of the tracked individuals. Based upon the training data received, at block 904, the grouping system may become proficient at detecting the presence of an active group. In particular, the grouping system may identify pattern(s) in raw data indicative of an active group in an environment (e.g., the open environment 200).

In some embodiments, time-series data may be mined for patterns to identify and track groups. The time-series data may provide data over a period of time, which may help the machine learning logic to identify patterns of persons over time. These patterns may be used to identify and/or track groups based upon activities/patterns observed over time. For example, in an identification example, a group of users may be identified as part of a group when they participate in a particular common activity or common activities for a threshold amount of time, which may be observed as a pattern from the time-series data.

In another example, the machine learning system may also be equipped to recognize that not all members of a group may be present within a certain proximity to each other. For example, one or more persons of an active group may go to a restroom, while one or more persons of the same active group do not go to the restroom. In this case, the grouping system may retain the identities of all the members of the active group and/or determine sub-groups of the active group, which may correspond to one or more persons within the active group. Indeed, in keeping with the example above, a first sub-group of the active group may be members of the active group who go to the restroom while a second sub-group may be members of the active group who do not go to the restroom while the first sub-group is in the restroom. Further, an active group may correspond to a group that remains in a database of detected groups in a certain time period. For instance, an active group may remain active as long as one or more members of the group are present in the open environment 200 of FIG. 2 within a certain time duration.

At Block 906, the machine learning system may determine if a person or group (e.g., a sub-group) is at least a part of an active group based at least on the training data and the identified pattern(s) indicative of an active group. For example, the machine learning system may determine that two individuals who spent a past hour together are a group. As another example, the grouping system may group individuals who show affection to each other such as holding each other's hands. Indeed, the grouping system may employ weighted probabilities in determining if one or more individuals should be grouped. Specifically, one or more behavioral pattern(s), characteristics, and/or attributes observed with certain tracked identities may be weighted with probabilities and utilized to determine groups. For instance, the grouping system may attach a weighted probability (e.g., a value between zero and one) of being in a group to an individual of small stature, since, typically, infants or toddlers may not be without adult supervision. Nevertheless, the grouping system may employ weighted probabilities to other attributes and/or behaviors of individuals (e.g., a common location, a proximity, an association with the same car, etc.). The grouping system may add up the weighted probability values of being in a group and may determine that the individual(s) to whom the weighted probability values are associated with are part of a group or are a group, respectively. In some embodiment, one of the weighted probability values may be enough to exceed a threshold value for determining if the individual(s) to whom the weighted probability values are associated with are part of a group, or form a group, respectively.

At block 908, the grouping system may update a database comprising active groups. Upon the determination of a newly identified group, the database, which includes active groups may be updated to allow for tracking. Thus, the machine learning system may keep a record of who is grouped. In some embodiments, the grouping may impact downstream processing. For example, as will be discussed below, group tracking may even be utilized in a gaming experience.

Figure 10:
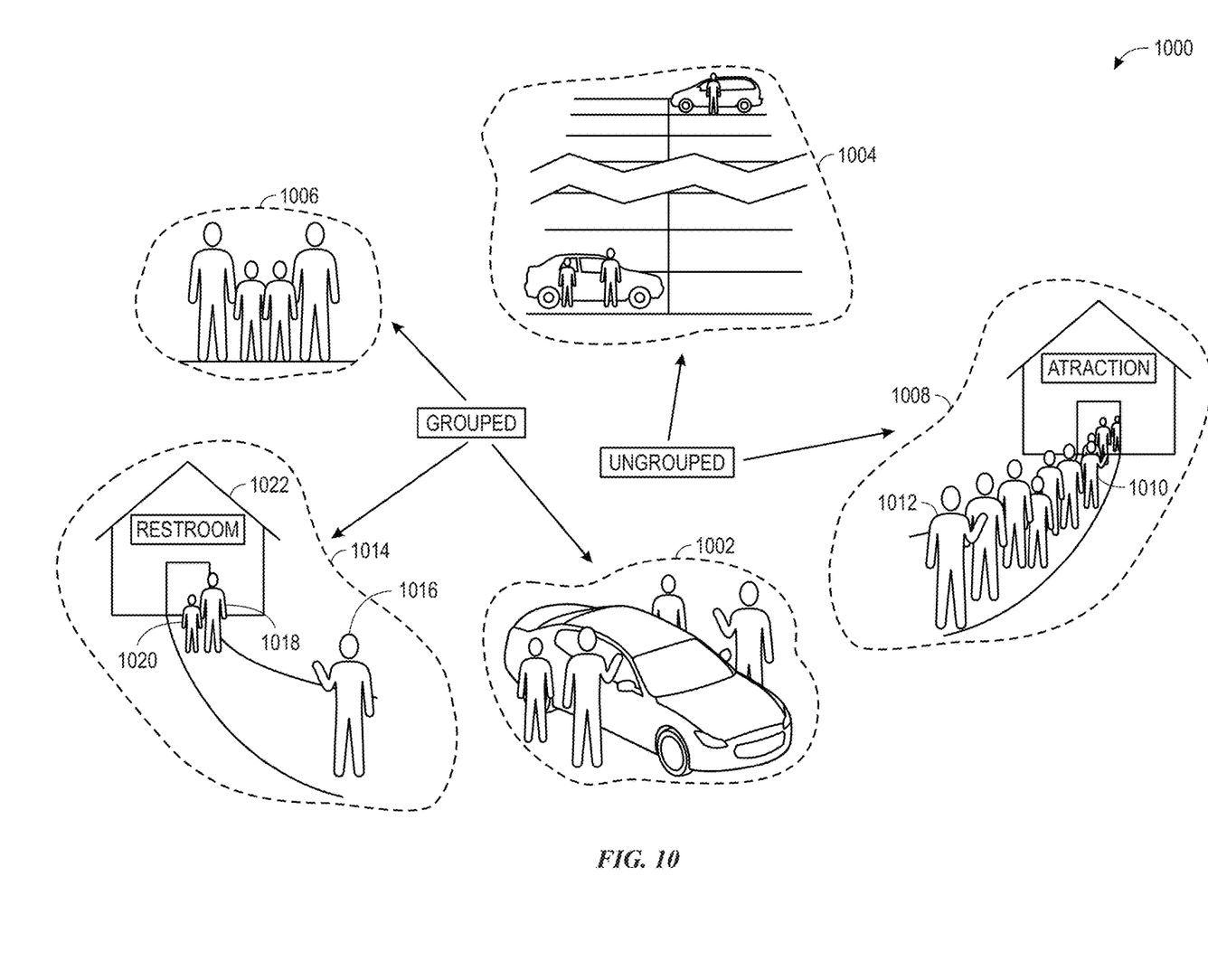
FIG. 10 is an illustration of grouped and ungrouped individuals, in accordance with an embodiment.

As mentioned herein, the grouping system may identify groups of individuals based upon activities/patterns observed in time-series data (e.g., as captured by the sensors of a sensor system). Any number of patterns may be identified by machine learning algorithms, which may implement supervised machine learning to train the grouping system how to identify groups. For discussion sake, FIG. 10 is a schematic 1000, providing examples of collections of individuals who are deemed likely a group and/or unlikely a group by a grouping system that uses the techniques described herein. Specifically, as shown in an illustration 1002, individuals who exit or enter the same vehicle may be deemed likely to be grouped by the grouping system. In contrast, as shown in illustration 1004, individuals who exit or enter different vehicles with relatively long distances between the vehicles may be deemed unlikely to be grouped. Further, as shown in illustration 1006, individuals in proximity to one another for a significant amount of time are likely to be grouped. However, individuals that are spaced apart that may pass a certain threshold distance in a queue for an attraction may be deemed less likely to be grouped. For example, in an illustration 1008, each person 1011 represents twenty individuals in line. As shown in an illustration 1008, an individual 1010 is separated from another individual 1012 in the line for the attraction by one hundred persons, thus, the grouping system may determine that individual 1010 and individual 1012 should not be grouped. However, in some cases, the grouping system may determine that individuals are deemed likely to be grouped even if they are spaced apart. As displayed in an illustration 1014, a person 1016, a person 1018, and a person 1020 may be deemed likely to be grouped even though the person 1016 is separated from the persons 1018, 1020. In this case, persons 1018, 1020 are going towards a restroom 1022, while the person 1016 is waiting outside. The grouping system may determine that the persons 1016, 1018, 1020 are a group even though the person 1016 may be alone for a period of time. Furthermore, the grouping system may also group individuals who are separated, but have spent time together pass a certain threshold time period. For instance, a person in a group may choose to sit in a rest area rather than wait in a queue for an attraction with another person of the same group. Thus, the grouping system may keep groups in an active status for a period of time, even though one or more members of the group are separated.

Figure 11:
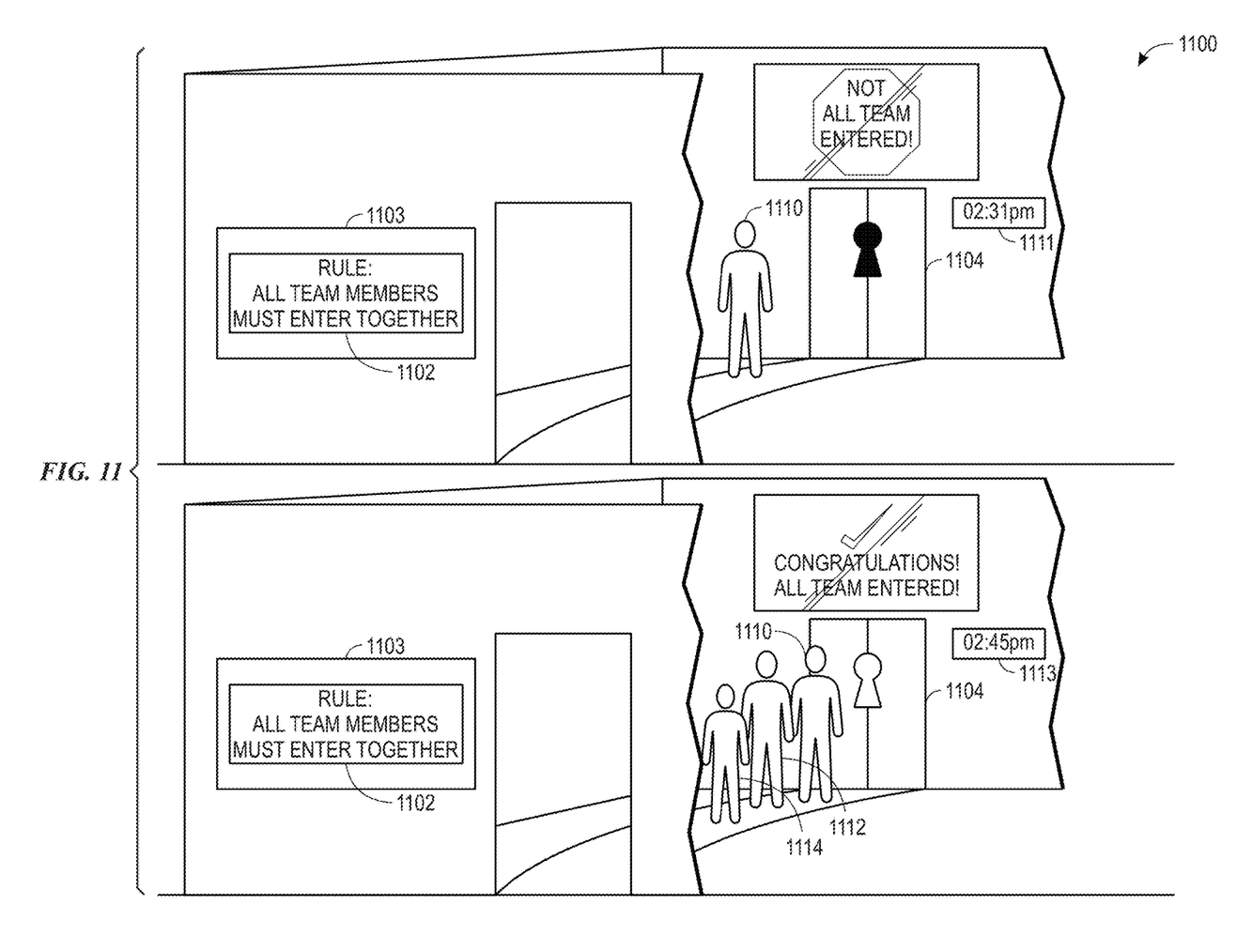
FIG. 11 is an illustration of a use case for changing an interactive environment based on a compliance rule, in accordance with an embodiment.

As may be appreciated, once groups are identified, additional functionalities may be implemented. For example, FIG. 11 is an illustration 1100 of how a group recognized by the grouping system may change interactive environments of an interactive game. In the illustration 1100, compliance with a rule 1102 on a display 1103 is necessary to unlock a door 1104 (e.g., a portal in a virtual and/or augmented reality experience, etc.). The rule 1102, which denotes "All team members must enter together," must be satisfied for entry into the door 1104. Here, the grouping system has identified persons 1114 and 1112 as part of a group/team with person 1110. However, these persons 1114 and 1112 are not present with person 1110. Since not all team members are present with a team member 110 at a time 1111, the door is not unlocked. Later, at a time 1113, all team members (e.g., persons 1110, 1112, 1114) are present at the door 1104. In response to the presence of the whole group, an effect emerges from the interactive environment (e.g., the door 1104 unlocks). Thus, by tracking groups, one or more components of an interactive environment may be controlled based on group aspects (e.g., location of team members, accumulated activities of team members, etc.), providing a fun and interactive experience to guests.

Figure 12:
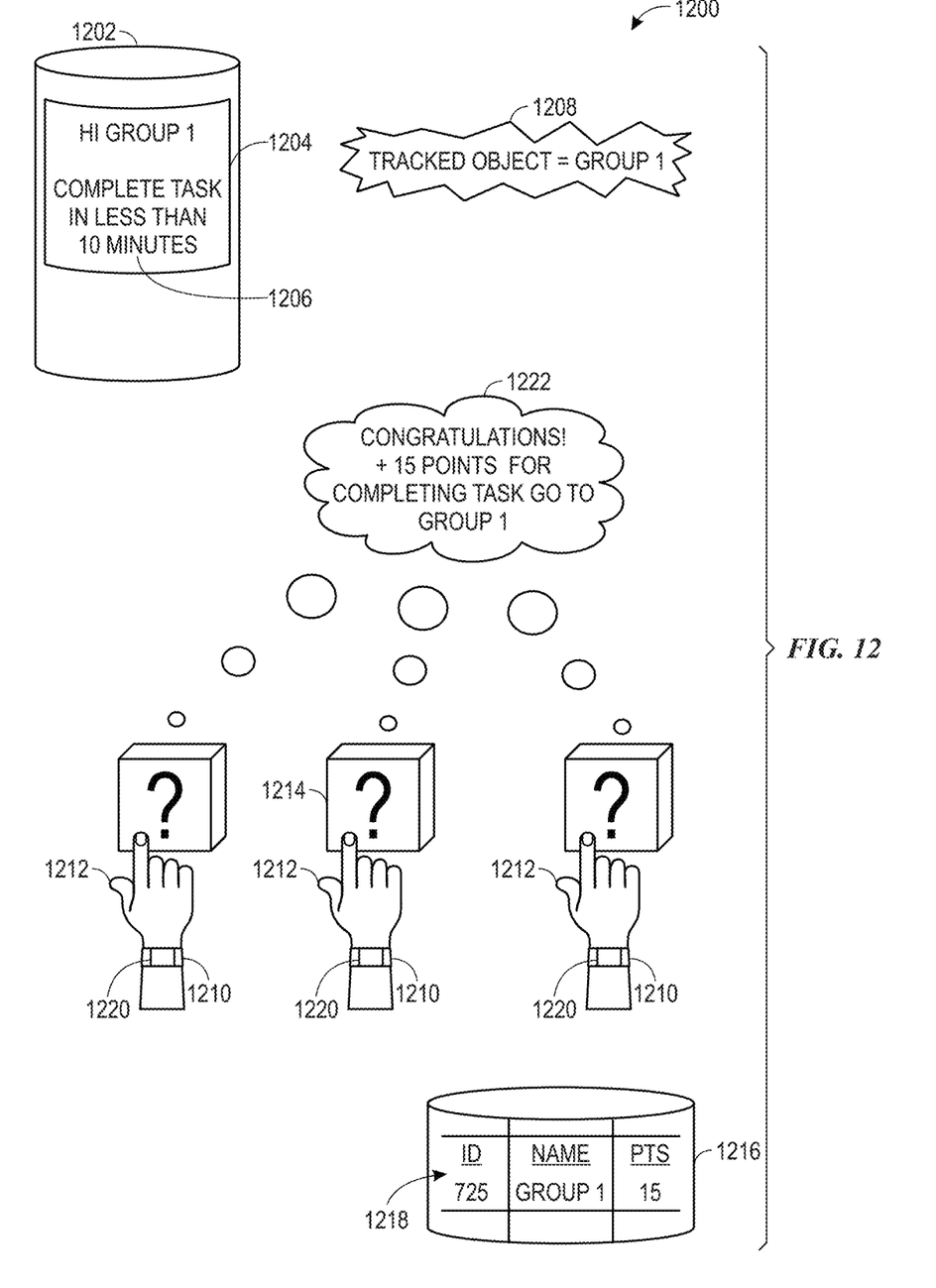
FIG. 12 is a schematic diagram, illustrating example control actions based upon tracked identities, in accordance with an embodiment.

FIG. 12 is a schematic diagram, illustrating example control actions 1200 that may be achieved based upon group identities tracked via the contextual tracking techniques provided herein, in accordance with an embodiment. Similar to FIG. 8, FIG. 12 includes a kiosk 1202 or another device may include a display 1204. The display 1204 may present a graphical user interface (GUI) 1206 that provides information about the open environment. As illustrated, the GUI 1206 may be personalized based upon a tracked identity. For example, as illustrated by the status balloon 1208, the contextual tracking system may identify that a tracked object is part of a tracked group "Group 1" based upon context data tradeoffs between the various target sensors. In response to the tracked object nearing the display 1204, a control action command may be presented to the display 1204 (e.g., the underlying hardware controlling the display 1204) instructing the GUI 1206 to display information relevant to the identified group. Here, for example, Group 1 is provided with instructions associated with their identity. Specifically, the GUI 1209 says "Hi Group 1, complete task in less than 10 minutes." As may be appreciated, each group identity may be associated with a unique identifier and other information (e.g., wait times, instructions, demographic information, and/or other personalized data), enabling personalized control actions to be performed.

In another embodiment, each member of the tracked group 1212 (i.e. Group 1) may have a wearable device 1210 that is communicatively coupled with one or more components of the contextual tracking system. Based upon an interaction with an open environment feature 1214, here a virtual game mystery box, personalized data associated with the identity of the tracked group may be updated. For example, here a game database 1216 may be updated, via a control action command, to reflect the updated game status based upon interaction with the open environment feature 1214. Thus, as illustrated in database record 1218, the identity 456, which is associated with Group 1 is provided with an additional 15 points in the database. Further, a display 1220 of the wearable devices 1210 on each of the group members may be controlled, via a control action command, to display an indication 1222 confirming the status change based upon the interaction of each member of the tracked group 1212 with the open environment feature 1214.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, machine-readable medium, comprising machine-readable instructions that, when executed by one or more processors of a machine, cause the machine to:
   receive a tracked target context for a first tracked object from a first tracking sensor system tracking a first coverage area;
   provide the tracked target context from the first tracking sensor system to a second tracking sensor system tracking a second coverage area different than the first coverage area, wherein the second tracking sensor system is different than the first tracking sensor system; and
   cause identification of a newly observed tracked target by the second tracking sensor system based upon the tracked target context from the first tracking sensor system, by:
      filtering-out a candidate from a set of candidates that the newly observed tracked target can be identified as based upon the tracked target context from the first tracking sensor system, by determining that the candidate is observed at a previous location outside a range of identified locations predicted to be reachable by the candidate during a time difference between a time the candidate was observed at the previous location and a time the newly observed tracked target was observed by the second tracking sensor system; and
      providing the set of candidates without the candidate to the second tracking sensor system.

2. The machine-readable medium of claim 1, comprising machine-readable instructions that, when executed by the one or more processors of the machine, cause the machine to:
   filter from the set of candidates a first subset of the set of candidates that the newly observed tracked target can not be identified as based upon the tracked target context from the first tracking sensor system; and identify, via the second tracking sensor system, the identification of the newly observed tracked target from the set of candidates without the first subset.

3. The machine-readable medium of claim 2, comprising machine-readable instructions that, when executed by the one or more processors of the machine, cause the machine to:
generate a blacklist based upon the first subset; and
provide the blacklist to the second tracking sensor system.

4. The machine-readable medium of claim 2, comprising machine-readable instructions that, when executed by the one or more processors of the machine, cause the machine to:
generate a blacklist based upon the first subset; and
provide the set of candidates without the blacklist to the second tracking sensor system.

5. The machine-readable medium of claim 1, comprising machine-readable instructions that, when executed by the one or more processors of the machine, cause the machine to:
filter from the set of candidates a second subset of the set of candidates that the newly observed tracked target can be identified as based upon the tracked target context from the first tracking sensor system; and
identify, via the second tracking sensor system, the identification of the newly observed tracked target from the second subset.

6. The machine-readable medium of claim 5, comprising machine-readable instructions that, when executed by the one or more processors of the machine, cause the machine to:
determine the second subset as a portion of the set of candidates observed at a previous location inside a range of identified locations predicted to be reachable by the candidate during a time difference between a time the set of candidates were observed at the previous location and a time the newly observed tracked target was observed by the second tracking sensor system.

7. The machine-readable medium of claim 5, comprising machine-readable instructions that, when executed by the one or more processors of the machine, cause the machine to:
generate a whitelist based upon the second subset; and
provide the whitelist to the second tracking sensor system.

8. The machine-readable medium of claim 1, wherein the first tracking sensor system, the second tracking sensor system or both, comprise: a light detection and ranging (LIDAR) system, a radio frequency identification (RFID) system, a computer vision system, a Time of Flight (ToF) system, a Millimeter Wave (mmWave) system, or any combination thereof.

9. The machine-readable medium of claim 8, wherein the second tracking sensor system comprises the LIDAR system.

10. The machine-readable medium of claim 1, comprising machine-readable instructions that, when executed by the one or more processors of the machine, cause the machine to:
determine a prediction confidence score indicative of a confidence level of the identification of the newly observed tracked target; and
gather additional tracking sensor system inputs for another identification of the newly observed tracked target in response to the prediction confidence score failing to meet a confidence threshold.

11. The machine-readable medium of claim 10, comprising machine-readable instructions that, when executed by the one or more processors of the machine, cause the machine to gather the additional tracking sensor system inputs by providing a direction to the newly observed tracked target to proceed to a tracking sensor system coverage area.

12. The machine-readable medium of claim 11, comprising machine-readable instructions that, when executed by the one or more processors of the machine, cause the machine to provide encouragement by incentivizing the newly observed tracked target to proceed to the tracking sensor system coverage area.

13. The machine-readable medium of claim 1, wherein the first tracked object comprises a different object type than the newly observed tracked target.

14. The machine-readable medium of claim 13, wherein the first tracked object comprises a vehicle and the newly observed tracked target comprises one or more persons.

15. The machine-readable medium of claim 1, comprising machine-readable instructions that, when executed by the one or more processors of the machine, cause the machine to:
receive training data indicative of a group of persons and associated attributes;
identify patterns in the associated attributes to identify grouping attributes indicating that persons should be grouped;
determine if the first tracked object is associated with the patterns; and
in response to determining that the first tracked object is associated with the patterns, identify the first tracked object as part of an active group.

16. The machine-readable medium of claim 15, comprising machine-readable instructions that, when executed by the one or more processors of the machine, cause the machine to:
determine if a second tracked object is a member of the active group, based upon the patterns, by:
determining an amount of time the first tracked object and the second tracked object have spent in a threshold proximity to each other; and
when the amount of time exceeds a threshold, associating the second tracked object with the active group.

17. The machine-readable medium of claim 15, comprising machine-readable instructions that, when executed by the one or more processors of the machine, cause the machine to:
determine if a second tracked object is a member of the active group, based upon the patterns, by:
associating a first weighted probability to the second tracked object, wherein the first weighted probability represents a likelihood that the second tracked object is a member of the active group;
associating a second weighted probability to the second tracked object, wherein the second weighted probability represent a second likelihood that the second tracked object is a member of the active group; and
when an addition of the first weighted probability and the second weighted probability exceeds a threshold value, associate the second tracked object with the active group.

18. The machine-readable medium of claim 17, wherein the first weighted probability is a value representative of an amount of time the second tracked object has spent in proximity to the first tracked object.

19. The machine-readable medium of claim 1, wherein determining the range of identified locations predicted to be reachable by the candidate during the time difference comprises including an estimated time the candidate will remain at the previous location.

20. A computer-implemented method, comprising:
receiving tracking sensor system inputs comprising a tracked target context for a first tracked object from a first tracking sensor system tracking a first coverage area;
providing the tracked target context from the first tracking sensor system to a second tracking sensor system tracking a second coverage area different than the first coverage area, wherein the second tracking sensor system is different than the first tracking sensor system; and
causing identification of a newly observed tracked target by the second tracking sensor system based upon the tracked target context from the first tracking sensor system, by:
filtering-out a candidate from a set of candidates that the newly observed tracked target can be identified as based upon the tracked target context from the first tracking sensor system, by determining that the candidate is observed at a previous location outside a range of identified locations predicted to be reachable by the candidate during a time difference between a time the candidate was observed at the previous location and a time the newly observed tracked target was observed by the second tracking sensor system; and
providing the set of candidates without the candidate to the second tracking sensor system.

21. The computer-implemented method of claim 20, comprising:
determining a prediction confidence score indicative of a confidence level of the identification of the newly observed tracked target; and
gathering additional tracking sensor system inputs for another identification of the newly observed tracked target in response to the prediction confidence score failing to meet a threshold.

22. The computer-implemented method of claim 20, wherein the first tracked object and the newly observed tracked target comprise a first group of individuals.

23. The computer-implemented method of claim 20, wherein determining the range of identified locations predicted to be reachable by the candidate during the time difference comprises including an estimated time the candidate will remain at the previous location.

24. A system, comprising:
a first tracking sensor system, configured to track a first tracked object in a first coverage area;
a second tracking sensor system, configured to track a second tracked object in a second coverage area different than the first coverage area; and
a contextual tracking system, configured to:
receive a tracked target context for the first tracked object from the first tracking sensor system;
provide the tracked target context from the first tracking sensor system to the second tracking sensor system different than the first tracking sensor system; and
cause identification of the second tracked object based upon the tracked target context from the first tracking sensor system, wherein the second tracking sensor system is different than the first tracking sensor system, by:
filtering-out a candidate from a set of candidates that the second tracked object can be identified as based upon the tracked target context from the first tracking sensor system, by determining that the candidate is observed at a previous location outside a range of identified locations predicted to be reachable by the candidate during a time difference between a time the candidate was observed at the previous location and a time the second tracked object was observed by the second tracking sensor system; and
providing the set of candidates without the candidate to the second tracking sensor system.

25. The system of claim 24, wherein the first tracking sensor system comprises a different sensor type than the second tracking sensor system.

* * * * *